United States Patent [19]

Pollack

[11] Patent Number: 4,935,722
[45] Date of Patent: Jun. 19, 1990

[54] TRANSPARENT EYELEVEL UPCONVERSION STOPLIGHT FOR VEHICLES

[75] Inventor: Slava A. Pollack, Via Del Monte, Calif.

[73] Assignee: Hughes Aircraft Company, Los Angeles, Calif.

[21] Appl. No.: 431,813

[22] Filed: Nov. 6, 1989

[51] Int. Cl.$^5$ .............................................. B60Q 1/26
[52] U.S. Cl. ................................... 340/479; 340/468; 362/80.1; 307/10.8
[58] Field of Search ............... 340/468, 479; 307/10.8; 362/80.1, 84; 315/77

[56] References Cited

U.S. PATENT DOCUMENTS

| | | | |
|---|---|---|---|
| 4,745,525 | 5/1988 | Sheehy | 362/80 X |
| 4,782,494 | 11/1988 | Pollack et al. | 372/69 X |
| 4,806,903 | 2/1989 | Rust | 340/464 |

Primary Examiner—Joseph A. Orsino
Assistant Examiner—Jeffery A. Hofsass
Attorney, Agent, or Firm—Charles D. Brown; Wanda Denson-Low

[57] ABSTRACT

A transparent eyelevel stoplight for vehicles is disclosed, which operates on an upconversion principle wherein red light in an otherwise transparent crystal is excited by invisible infrared radiation. The crystal may take the form of a transparent plate or an optical fiber applied to the vehicle rear window. The host crystal material is doped with a suitable rare-earth ion, which when illuminated by infrared energy produces visible light. An infrared laser may be used to illuminate the doped crystal, and is activated by the vehicle brakes. The crystal material is transparent to ordinary visible light and therefore will not obscure the driver's vision.

12 Claims, 2 Drawing Sheets

TRANSPARENT EYELEVEL UPCONVERSION STOPLIGHT FOR VEHICLES

BACKGROUND OF THE INVENTION

The present invention relates generally to a vehicle brake or stoplight known as a center high mounted stop-light which is mounted on the inside of a vehicle rear window, and more particularly is directed to a transparent stoplight device employing a light upconversion effect, and which can be mounted on the rear window without obscuring rearward visibility.

Present Federal regulations require center high mounted stoplights in addition to the standard stoplights mounted in the rear portion of an automobile The high mounted stoplights are intended to maximize the visibility of the automobile braking indication to drivers following the braking vehicle, and are commonly mounted on the rear window of an automobile.

Center high mounted stoplights have commonly been implemented as a standard lenticular lens and an illuminating incandescent bulb enclosed in a housing that is typically secured adjacent the top or bottom of an automobile rear window However, the bulky housing partially obscures the rearward vision of the driver, and moreover imposes limitations on the design of the automobile. Center high mounted stoplights have been also integrated into automobile body parts such as rear decks, spoilers, and roofs, which to some degree reduce or remove the rearward vision problem. However, such stoplights are complex and may impose limitations on the design of the automobile.

SUMMARY OF THE INVENTION

It would therefore be an advantage to provide a center high mounted stoplight which is mounted on a rear window of an automobile and which does not obscure the driver's vision.

The foregoing and other advantages are provided in a transparent eyelevel stoplight wherein the operating principle of the device is based on an upconversion process for converting invisible infrared radiation into visible radiation. The apparatus comprises an upconverting element, such as a transparent host crystal, doped with a rare-earth ion such as erbium. Red light is produced in such a crystal by illuminating it with invisible infrared radiation. The doped crystal may take the form of a flat plate or an optical fiber. The infrared source, such as an infrared laser, is activated when the automobile brakes are applied to the vehicle, to illuminate the upconverting element with infrared energy. This infrared energy is upconverted to visible light, preferably in the red wavelength region, thereby signalling that the vehicle brakes have been applied.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Upconversion is a property of several rare-earth ions; the most prominent among these ions is the $E_r^{3+}$ ion (erbium). When incorporated in a suitable host crystal, erbium is capable of converting intense infrared radiation, at 0.98 and 1.5–1.6 microns, into visible light in the red or green colors. By selecting the host and erbium concentration, it is possible to produce either green or red light alone. The upconversion phenomenon is discussed in "Upconversion use for viewing and recording infrared images," S. A. Pollack et al., Applied Optics, Volume 26, Number 20, Oct. 15, 1987, at pages 4400–4406, the entire contents of which are incorporated herein by this reference. The selection of the infrared wavelength and intensity, and the host and erbium concentrations needed to achieve up conversion to the red color, is known in the art, see, for example, F. Auzel, "Materials and Devices Using Double Pumped Phosphers With Energy Transfer," Proceedings of the IEEE, Volume 61, No. 6, page 750, June 1973.

In accordance with the present invention, the transparent stoplight can comprise an upconverting element attached to the rear window and illuminated with intense infrared light generated by an infrared laser and activated by the vehicle brakes. The upconverting element may comprise a fiber made from the upconverting material, and attached to the rear window. Infrared laser radiation is injected into the upconverting fiber. Alternatively, the upconverting element may comprise a flat plate of the upconverting material, illuminated by infrared energy from the infrared laser. Both the plate and fiber are transparent to ordinary visible light and therefore will not obscure the driver's vision.

Figure 1:
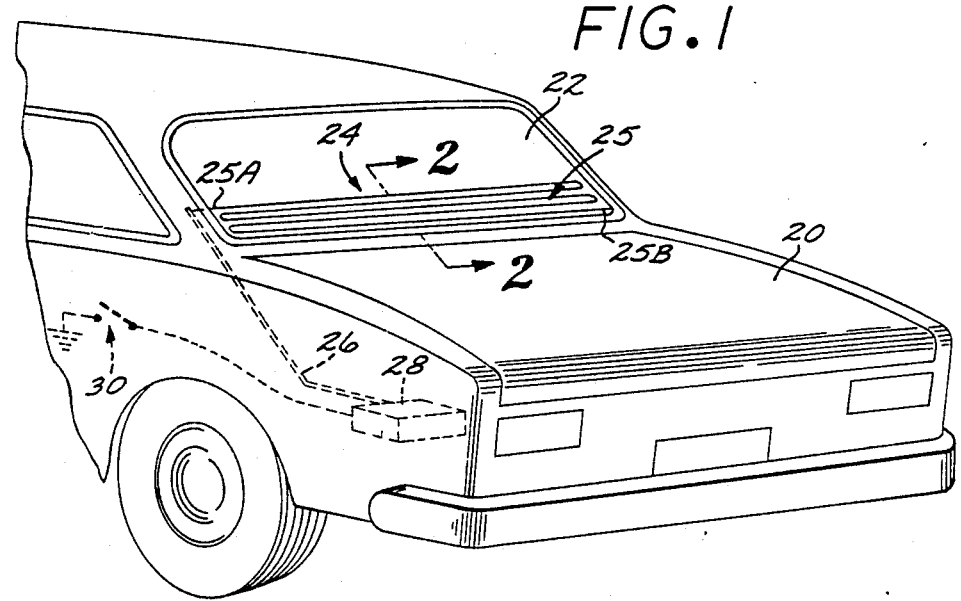
FIG. 1 is a simplified schematic diagram illustrating a center high mounted stoplight installed in a vehicle in accordance with the invention.

Referring now to FIG. 1, a vehicle 20 includes a rear window 22 in the conventional manner. The stoplight upconverting element 24 in this embodiment takes the form of an upconverting fiber 25 disposed along the lower region of the rear window. The fiber 25 may have a diameter similar to that of conventional optical fiber, e.g., 50 to 200 microns. The fiber 25 may be sandwiched between the two singlets 22A and 22B which comprise a conventional vehicle safety window laminate in the manner illustrated in the cross-sectional view of FIG. 2.

The optical fiber 25 has two ends 25A and 25B. End 25A is coupled to optical fiber 26, which is in turn connected to infrared laser 28, by conventional optical coupler devices (not shown). The laser 28 is in turn activated when the vehicle brakes are applied through a brake pedal switch arrangement indicated generally as switch 30. The laser 28 is switched on and off in the same manner as the conventional vehicle stoplights. The laser 28 may comprise a solid state infrared laser, which is commercially available; one commercial supplier for such lasers is Kigre, Inc., 5333 Secor Road, Toledo, Ohio 43623.

The optical fiber 25 in this embodiment comprises a base crystal material, e.g., zirconium glass (ZbLan) fibers, doped with rare-earth erbium ($Er^{3+}$). The concentration of erbium is selected in cooperation with the emission wavelength of the laser 28 to provide red light emission when the fiber is illuminated by infrared energy from the laser 28. Thus, when the vehicle brakes are applied, the laser 28 is activated, producing infrared energy which is injected into the fiber 25. The dopant in the base fiber material causes infrared energy to be converted into visible red light to provide a stoplight effect visible in the lower region of the vehicle rear window 22. When the vehicle brakes are released, the infrared laser 28 is not activated and the upconvertor element 24 is transparent to visible light.

Figure 2:
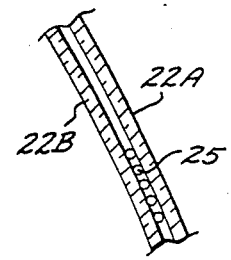
FIG. 2 is a cross-sectional view taken along line 2—2 of FIG. 1, showing the sandwiched arrangement of fibers between the rear window singlets.

In the embodiment of FIGS. 1-2, the optical fiber 25 comprising element 24 is run between the sides of the window 22 and is looped back at each side to form a series of substantially parallel fiber segments (illustrated in FIG. 2) from a single length of optical fiber.

Figure 3:
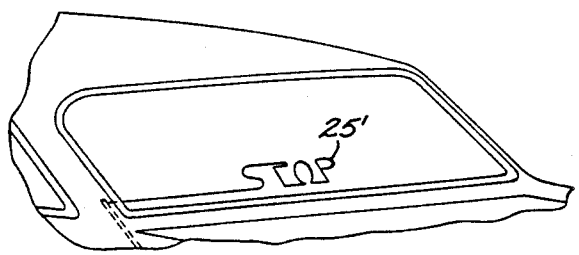
FIG. 3 is a diagrammatic view illustrative of a second embodiment of the subject invention.

In another embodiment shown in FIG. 3, an optical fiber 25' comprising the upconverting element is applied to the rear window 22 in such a fashion that an image of the word "STOP" is generated when the infrared laser is activated. Thus, the fiber 25' is placed between the window singlets so that the fiber defines "STOP" when illuminated with infrared energy.

Figure 4:
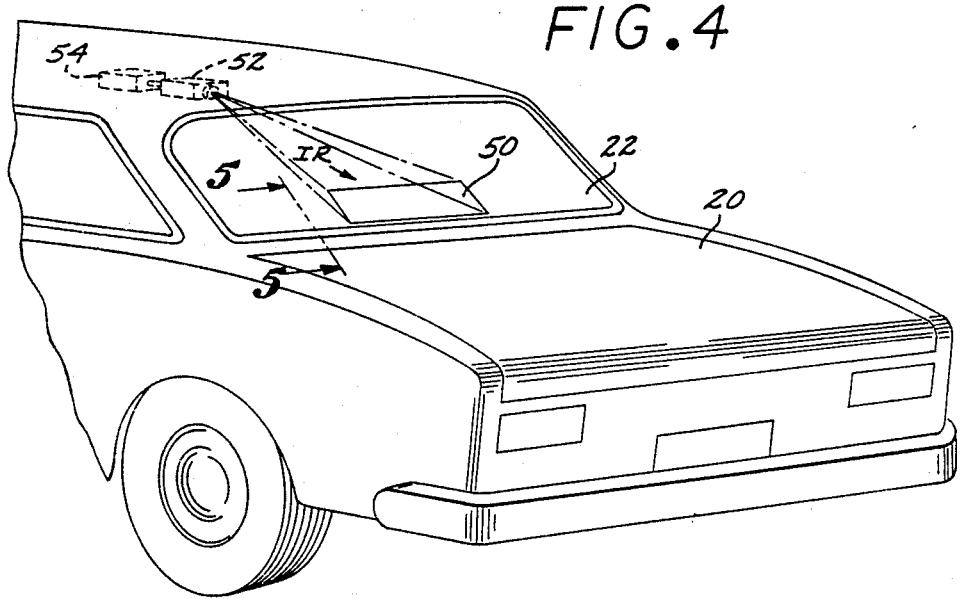
FIG. 4 is a simplified diagram illustrating a third embodiment of a center high-mounted stoplight installed in a vehicle in accordance with the invention.
Figure 5:
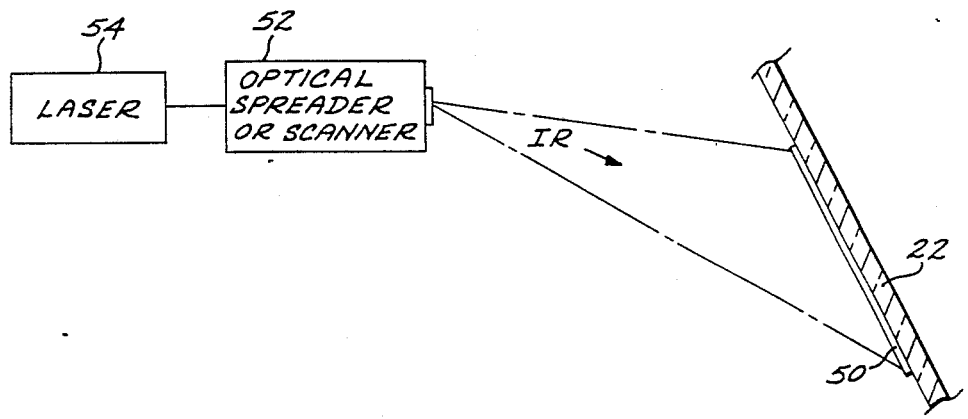
FIG. 5 is a schematic diagram illustrating the principle components of the stoplight apparatus of FIG. 4.

A third embodiment is shown in FIGS. 4 and 5. Here, the upconverting element comprises a plate 50 affixed to a region of the rear window 22. The plate 50 comprises a base crystal material such as calcium fluoride ($CaF_2$) doped with a suitable concentration of rare earth ions, such as erbium, so as to upconvert incident infrared energy from an infrared source into red (visible) light. The light source preferably comprises an infrared laser 54 for generating infrared energy only when the vehicle brakes are activated. Element 52 may comprise a means for optically spreading the infrared laser beam generated by the laser 54 so that the infrared energy illuminates a substantial region of the plate 50 area. The element 52 in this case may comprise a lens or spherical mirror. Alternatively, the device 52 may comprise a means for scanning the laser beam over the area of the plate 50, e.g., in a raster-like manner. The scanned beam may produce, for example, a visible image (in red light) of the word "STOP." Such laser beam scanning apparatus is commercially available. One supplier for such apparatus is Chesapeak Laser Systems, Inc., 4473 Forbes Boulevard, Lanham, Md. 20706.

While the present invention has been described with respect to the center high mounted stoplight, the invention is equally suited for use as the standard stoplights or brake lights of an automobile. In particular, the invention can be employed to construct very thin brake lights which do not require light bulbs and do not occupy significant trunk space nor produce protrusions into the volume of the trunk, thus reducing the useful trunk volume.

It is understood that the above-described embodiment are merely illustrative of the possible specific embodiments which may represent principles of the present invention. Other arrangements may readily be devised in accordance with these principles by those skilled in the art without departing from the scope of the invention.

What is claimed is:

1. A stoplight for a vehicle, comprising: an upconverting element comprising a host material substantially transparent to visible light, said host material being doped with a rare-earth ion in a suitable concentration so as to upconvert incident infrared radiation into light in the visible range;
    a source of infrared radiation for illuminating said up converting element upon command; and
    means for activating the source of infrared radiation when the vehicle brakes are activated,
    whereby said up converting element converts the incident infrared radiation into visible light when the brakes are activated, and is substantially transparent to visible light.

2. The stoplight of claim 1 wherein said concentration of rare-earth ions is selected so that the upconverted visible light is in the red wavelength range.

3. The stoplight of claim 1 wherein said infrared radiation source comprises an infrared laser.

4. The stoplight of claim 1 wherein said upconverting element comprises a plate of said doped host material applied to the rear window of the vehicle.

5. The stoplight of claim 1 wherein said host material is calcium fluoride and said dopant is erbium.

6. The stoplight of claim 1 wherein said element comprises a fiber of said doped host material attached to the rear window of the vehicle.

7. The stoplight of claim 6 wherein said host material is zirconium glass.

8. The stoplight of claim 7 wherein said rear-earth ion is the triply ionized rare earth erbium atom.

9. A transparent eyelevel upconversion stoplight for vehicles, comprising:
    an upconverting element attached to the vehicle rear window, said element comprising a host material substantially transparent to visible light, said host material being doped with a rare earth ion in a suitable concentration so as to upconvert incident infrared radiation into light in the visible red range;
    an infrared laser for generating infrared radiation to illuminate said upconverting element when activated; and
    means for activating the infrared laser when the vehicle brakes are activated;
    whereby the upconverting element converts the incident infrared radiation into red, visible light when the brakes are activated, and is substantially transparent to visible light.

10. The stoplight of claim 9 wherein said upconverting element comprises an optical fiber secured to an area of the rear window, said optical fiber fabricated from said doped host material, and said optical fiber is optically coupled to said laser so that infrared energy emitted by said laser is injected into said optical fiber.

11. The stoplight of claim 10 wherein the rear window comprises a pair of window singlets, and said optical fiber is disposed between the singlets.

12. The stoplight of claim 10 wherein said optical fiber is secured to the rear window so as to provide an image of the word "STOP" when the laser is activated.

* * * * *